(12) United States Patent
Okamoto

(10) Patent No.: US 7,242,127 B2
(45) Date of Patent: Jul. 10, 2007

(54) BRUSH DEVICE AND MOTOR WITH BRUSH

(75) Inventor: Atsushi Okamoto, Tokyo (JP)

(73) Assignee: Namiki Seimitsu Housebi Kabushikikaisha, Tokyo (JP)

( * ) Notice: Subject to any disclaimer, the term of this patent is extended or adjusted under 35 U.S.C. 154(b) by 0 days.

(21) Appl. No.: 10/545,966

(22) PCT Filed: Feb. 25, 2004

(86) PCT No.: PCT/JP2004/002197

§ 371 (c)(1),
(2), (4) Date: Jul. 12, 2006

(87) PCT Pub. No.: WO2004/077646

PCT Pub. Date: Sep. 10, 2004

(65) Prior Publication Data

US 2007/0001537 A1    Jan. 4, 2007

(30) Foreign Application Priority Data

Feb. 28, 2003   (JP)   ............................. 2003-053695

(51) Int. Cl.
*H02K 39/38* (2006.01)
*H02K 39/18* (2006.01)
(52) U.S. Cl. ...................... 310/239; 310/242; 310/244; 310/248

(58) Field of Classification Search ................ 310/239, 310/240, 242–248
See application file for complete search history.

(56) References Cited

U.S. PATENT DOCUMENTS

| | | | | |
|---|---|---|---|---|
| 3,177,388 | A | * | 4/1965 | Cook .......................... 310/247 |
| 5,631,513 | A | * | 5/1997 | Coles et al. ................. 310/239 |
| 5,661,357 | A | * | 8/1997 | Iijima ......................... 310/239 |
| 6,927,532 | B2 | * | 8/2005 | Miyamoto et al. .......... 313/441 |

FOREIGN PATENT DOCUMENTS

| | | |
|---|---|---|
| JP | 07-213023 | 8/1995 |
| JP | 2003-169450 | 6/2003 |

* cited by examiner

*Primary Examiner*—Tran Nguyen
(74) *Attorney, Agent, or Firm*—Nixon Peabody LLP; Donald R. Studebaker

(57) ABSTRACT

A brush device having the longitudinal direction of a coil shaped coil spring aligned with the face of a brush holder, in which one end of a support post at the surface of a brush base is formed as a hollow cylinder and a projection at the other end is insert molded into the brush holder. There is a step on the support post. The step and the brush holder receive a cover plate which, when viewed from a direction perpendicular to the face of the brush holder, covers a winding of the coil shaped coil spring. One end of the support post is fixed to the surface of the cover plate by spreading the end of the hollow cylinder of the support post.

6 Claims, 17 Drawing Sheets

BRUSH DEVICE AND MOTOR WITH BRUSH

TECHNICAL FIELD

The present invention relates to the constitution of a brush for a motor with a brush that uses the brash made of carbon. In particular, it relates to a brush device in which the brush is pushed against a commutator by a coil spring, and a motor with a brush that is equipped with such a brush device.

BACKGROUND ART

A conventional brush device with a resilient means to impel the brush against the commutator (see Patent Document 1, for example) is shown in FIG. 16. This brush device 24 has a brush 19 formed in a substantially arc shape, which is supported by contact between part of its outer surface and the inner wall of a holder 22.

The outer face of the brush 19 at the end facing the commutator 2 is made to contact the inner wall of the holder 22 by the force of friction with the commutator 2, and the inner edge of the brush 19 at the end facing the torsion coil spring 23 is made to contact the inner wall of the holder 22 by impulse of the torsion coil spring 23. In this way, the brush 19 is supported within the gap g between the inner walls of the holder 22, and its ability to follow the commutator 2 is enhanced. Further, because the brush 19 is formed in an arc shape, the brush friction is maintained by rubbing and the overall diameter of the brush device is minimized.

However, there are still problems in the brush device 24 shown in FIG. 16, in regard to assuring reliable electrical conductivity between the commutator and the brush. In FIG. 16, the brush 19 is held just by providing the gap g between the inner walls of the holder 22, and the commutator 2 comprises, as an actual product, a number of commutator blades 2a. Accordingly, when the brush 19 straddles the space between the commutator blades 2a, the support of the brush 19 is destabilized and vibration is liable to occur.

Further, depending on the application of the motor with a bush, the commutator will sometimes be driven in opposite directions, clockwise and counter-clockwise. With the brush device in FIG. 16, however, if the direction is reversed and the commutator is driven clockwise, the brush 19 is liable to drift because of its two-point support in the gap g, and the instability of support of the brush 19 is liable to cause vibration.

The brush device 14 shown in FIGS. 17 and 18 was put into production in order to resolve the problems described above. In the case of this brush device 14, the commutator comprises commutator blades 2a mounted on the outer periphery of the motor shaft 1, separated by equal gaps, and the carbon brush 10 is fitted to and held by the support post 7 of the brush holder 4. This brush 10, as shown in FIG. 17, has a rubbing surface with electrical conductivity when in contact with the commutator blade 2a. The brush 10 has the arched brush arm 10a and the brush base 10b with the hole 8 through which the support post 7 passes for mounting the brush 10 on the brush holder 4. By forming the brush arm 10a and the brush base 10b as a single unit, the brush 10 is formed in substantially a V shape. The coil spring 5 or other means of impulse is mounted on the support post 7 and concentric with it, so that the rubbing face of the brush 10 is impelled against the commutator blade 2a and held in contact with the commutator 2.

Because the brush device 14 has a means of impulse such as the coil spring 5 (only one of the two brushes 10 is shown in FIG. 18), changes to the force of contact from friction between the brush 10 and the commutator 2 are prevented, and so there is superior stability of electrical conductivity between the commutator 2 and the brush 10. Moreover, there is the advantage that the brush arm 10, which corresponds to brush 19 in FIG. 16, is supported by the relatively large brush base 10b, and because this brush base 10b is fitted to the support post 7, the stability of brush support is greater than in the brush device of FIG. 16, so that the occurrence of vibration is inhibited when the motor is driven.

Nevertheless, the structure of the brush device 14 is such that the brush 10 is mounted over the coil spring 5, which is the means of impulse, and so the thickness of the brush device 14 increases that much more in the direction of the motor shaft 1. Consequently, there is the problem that miniaturization of the brushed motor in the direction of the motor shaft is impeded.

The present applicants earlier applied, in Japanese Patent Application No. 2001-367265, for the brush device 11 as shown in FIGS. 19 and 20. This application provides the guide 15 as part of the brush base 3b, as well as the recess 6 in the brush holder 4. Within this recess 6, one end of the coiled portion of the coil spring 5 is stopped by the stop face 3c of the brush base 3b, and the other end is stopped by the step 4a of the brush holder 4. The longitudinal direction of the coil spring 5 is aligned with the face of the brush holder 4 (the direction shown by arrow C in FIG. 20), and the winding follows the wall of at least one of the guide 15 and the recess 6; the coil spring 5 and the brush 3 are in substantially the same plane. This is the essence of the brush device 11.

By constituting the brush device 11 as described above, the longitudinal direction of the coil spring 5 is located in substantially the same plane as the face direction of the brush holder 4, and so the brush device can be made thinner than earlier brush devices. Further, by applying this brush device 11 in a motor with a brush, it is possible to reduce the length of the motor shaft 1 without impairing the characteristics of the brushed motor.

Patent Document 1: Japanese Patent Application Laid-Open No. H07-213023 (pages 3 and 4, FIG. 2)

DISCLOSURE OF THE INVENTION

However, the brush device 11 of the application described above also had shortcomings, as follows. Because the brush device 11 had the coil spring 5 mounted in substantially the same plane as the face direction of the brush holder 4, the spring 5 is exposed when the brush holder 4 is viewed from a direction perpendicular to that plane. Consequently, the windings gradually push out from the recess 6 as the brush device 11 is driven; as a result, the impulse of the spring 5 against the brush 3 weakens and it gradually becomes impossible to obtain the desired impulse of the brush contact face against the commutator blades 2a.

Moreover, in the manufacture of the brush device 11 on the basis of the content of that application, the brush 3 was mounted within the recess 6 of the brush holder 4 so that it could rotate around the support post 7', by inserting the support post 7' through the hole in the brush 3 and fitting and fixing the ring 7a'. Therefore, as shown in FIG. 20, it was inevitable that the strength with which the support post was attached to the surface 31b of the brush base 3b (the side indicated by the arrow a in the figure) was less than the strength on the opposite side, that is, the strength with which the support post 7 was fixed to the recess 6 (the side indicated by the arrow b in the figure).

That is to say, on the arrow b side, the support post 7' was fitted and fixed to the recess 6 of the brush holder 4, but on the arrow a side, the support post 7' was only fitted and fixed to the small ring 7a'. Accordingly, when the fixing strengths on the arrow a side and the arrow b side are compared, the fixing strength on the arrow a side is markedly less, and so the support post 7' was fixed to the recess 6 of the brush holder 4 with fixing strength that was essentially a matter of one-sided support. Consequently, as the brush contact fact rubbed against the commutator blade, the support post 7' was liable to become shaky, and vibration of the support post 7' made firm support of the brush 3 unobtainable.

Moreover, the heat that is generated when the motor with a brush is driven could only act on the point where the support post 7' was fitted and fixed to the surface 31b and the point where the support post 7' was fitted and fixed to the recess 6. Since the fittings were just a matter of pressure on the parts by means of stress, the action of the heat would weaken the stress and reduce the fitting strength in both places. This made the support post 7' all the more shaky, and the support of the brush 3 even less stable.

In this situation, there was the problem that the vibration accompanying the rotation of the commutator 2 was conveyed through the brush 3 and the support of brush 3 became unstable. Thus, there was a constant alternation of contact and non-contact between the commutator blades 2a and the contact faces of the brushes, so that electrical and mechanical reliability was markedly reduced.

The present invention has been devised in light of these problems, and an object of the present invention is to improve the contact characteristics of the brush of the brush device with the commutator, and thus to provide the brush device capable of reliable electrical connectivity.

The present invention provides a brush device comprising a brush and a spring, the brush including a brush arm made of carbon, which is substantially arc shaped and which has a contact face that conducts electricity when in contact with a commutator, and a brush base mounted so as to rotate around a support post, the brush being mounted in a brush holder so that rotation around the support post puts a contact face in contact with the commutator, the spring impeling the brush toward the commutator, wherein one end of the support post at a face side of the brush base is formed with a hollow cylinder and the other end is formed with a projection, the projection of the support post is fixed into the brush holder by insert molding, a guide is formed on a part of the brush base, a recess is formed in the brush holder within which one end of a winding of the coil spring is stopped by the brush base and the other end is stopped by the brush holder, the coil spring and brush are placed in substantially the same plane in such a manner that a longitudinal direction of the coil spring matches a direction of a surface of the brush holder and the winding of the coil spring follows the shape of at least one of the guide and the recess, and the one end of the support post is fixed to the surface of the brush base by spreading the hollow cylindrical end of the support post.

The present invention further provides a brush device comprising a brush and a spring, the brush including a brush arm made of carbon, which is substantially arc shaped and which has a contact face that conducts electricity when in contact with a commutator, and a brush base mounted so as to rotate around a support post, the brush being mounted in a brush holder so that rotation around the support post puts a contact face in contact with the commutator, the spring impeling the brush toward the commutator, wherein one end of the support post is formed with a hollow cylinder and the other end is formed with a projection, the projection of the support post is fixed into the brush holder by insert molding, a recess is formed in the brush holder, the brush base made of a sheet material includes an insertion tube for insertion of the support post and a guide for accommodating the coil spring, which are integrated with the brush member as a single unit, the brush is accommodated within the recess of the brush holder by insertion of the support post into the insertion tube, one end of a winding of the coil spring is stopped by the brush base and the other end is stopped by the brush holder, the coil spring and brush are placed in substantially the same plane in such a manner that a longitudinal direction of the coil spring matches a direction of a surface of the brush holder and the winding of the coil spring follows the shape of at least one of the guide and the recess, and the one end of the support post is fixed to one end of the insertion tube by spreading the hollow cylindrical end of the support post.

The present invention also provides a brush device comprising a brush and a spring, the brush including a brush arm made of carbon, which is substantially arc shaped and which has a contact face that conducts electricity when in contact with a commutator, and a brush base mounted so as to rotate around a support post, the brush being mounted in a brush holder so that rotation around the support post puts a contact face in contact with the commutator, the spring impeling the brush toward the commutator, wherein one end of the support post is formed with a hollow cylinder and the other end is formed with a projection, the projection of the support post is fixed into the brush holder by insert molding, the spring is constituted so as to be a torsion coil spring, a recess is formed in the brush holder, the brush base is made of a sheet material and includes an insertion tube for insertion of the support post that is integrated with the brush member as a single unit, the brush is accommodated within the recess of the brush holder by insertion of the support post into the insertion tube, the torsion coil spring is fitted over an outer periphery of the insertion tube in such a manner that a longitudinal direction of the torsion coil spring is placed perpendicular to a direction of the face of the brush holder, an end of a spring wire that extends from one side of a winding of the torsion coil spring is stopped by the brush holder and another end of the spring wire that extends from the other side is stopped by the brush, and the one end of the support post is fixed to one end of the insertion tube by spreading the hollow cylindrical end of the support post.

The present invention also provides a brush device comprising a brush and a spring, the brush including a brush arm made of carbon, which is substantially arc shaped and which has a contact face that conducts electricity when in contact with a commutator, and a brush base mounted so as to rotate around a support post, the brush being mounted in a brush holder so that rotation around the support post puts a contact face in contact with the commutator, the spring impeling the brush toward the commutator, wherein a guide is formed on a part of the brush base, a recess is formed in the brush holder within which one end of a winding of the coil spring is stopped by the brush base and the other end is stopped by the brush holder, the coil spring and brush are placed in substantially the same plane in such a manner that a longitudinal direction of the coil spring matches a direction of a surface of the brush holder and the winding of the coil spring follows the shape of at least one of the guide and the recess, and there is provided a cover plate attached so as to cover a winding of the coil spring when viewed from a direction perpendicular to the face of the brush holder.

The present invention further provides a brush device comprising a brush and a spring, the brush including a brush arm made of carbon, which is substantially arc shaped and which has a contact face that conducts electricity when in contact with a commutator, and a brush base mounted so as to rotate around a support post, the brush being mounted in a brush holder so that rotation around the support post puts a contact face in contact with the commutator, the spring impeling the brush toward the commutator, wherein a recess is formed in the brush holder, the brush base made of a sheet material includes an insertion tube for insertion of the support post and a guide for accommodating the coil spring, which are integrated with the brush member as a single unit, the brush is accommodated within the recess of the brush holder by insertion of the support post into the insertion tube, one end of a winding of the coil spring is stopped by the brush base and the other end is stopped by the brush holder, the coil spring and brush are placed in substantially the same plane in such a manner that a longitudinal direction of the coil spring matches a direction of a surface of the brush holder and the winding of the coil spring follows the shape of at least one of the guide and the recess, and there is provided a cover plate attached so as to cover a winding of the coil spring when viewed from a direction perpendicular to the face of the brush holder.

The present invention includes a brush device comprising a brush and a spring, the brush including a brush arm made of carbon, which is substantially arc shaped and which has a contact face that conducts electricity when in contact with a commutator, and a brush base mounted so as to rotate around a support post, the brush being mounted in a brush holder so that rotation around the support post puts a contact face in contact with the commutator, the spring impeling the brush toward the commutator, wherein one end of the support post at a face side of the brush base is formed with a hollow cylinder and the other end is formed with a projection, the projection of the support post is fixed into the brush holder by insert molding, a guide is formed on a part of the brush base, a recess is formed in the brush holder within which one end of a winding of the coil spring is stopped by the brush base and the other end is stopped by the brush holder, the coil spring and brush are placed in substantially the same plane in such a manner that a longitudinal direction of the coil spring matches a direction of a surface of the brush holder and the winding of the coil spring follows the shape of at least one of the guide and the recess, a step is formed on the support post, there is provided a cover plate attached so as to cover the winding of the coil spring when viewed from a direction perpendicular to the face of the brush holder, which is received by the step of the support post and a portion of the brush holder, and the one end of the support post is fixed to the surface of the cover plate by spreading the hollow cylindrical end of the support post.

The present invention includes a brush device comprising a brush and a spring, the brush including a brush arm made of carbon, which is substantially arc shaped and which has a contact face that conducts electricity when in contact with a commutator, and a brush base mounted so as to rotate around a support post, the brush being mounted in a brush holder so that rotation around the support post puts a contact face in contact with the commutator, the spring impeling the brush toward the commutator, wherein one end of the support post is formed with a hollow cylinder and the other end is formed with a projection, the projection of the support post is fixed into the brush holder by insert molding, a recess is formed in the brush holder, the brush base made of a sheet material includes an insertion tube for insertion of the support post and a guide for accommodating the coil spring, which are integrated with the brush member as a single unit, the brush is accommodated within the recess of the brush holder by insertion of the support post into the insertion tube, one end of a winding of the coil spring is stopped by the brush base and the other end is stopped by the brush holder, the coil spring and brush are placed in substantially the same plane in such a manner that a longitudinal direction of the coil spring matches a direction of a surface of the brush holder and the winding of the coil spring follows the shape of at least one of the guide and the recess, a step is formed on the support post, there is provided a cover plate attached so as to cover the winding of the coil spring when viewed from a direction perpendicular to the face of the brush holder, which is received by the step of the support post and a portion of the brush holder, and the one end of the support post is fixed to the surface of the cover plate by spreading the hollow cylindrical end of the support post.

The present invention provides a motor with a brush equipped with any one of the brush devices described above.

BEST MODE FOR CARRYING OUT THE INVENTION

Embodiment 1

Figure 1:
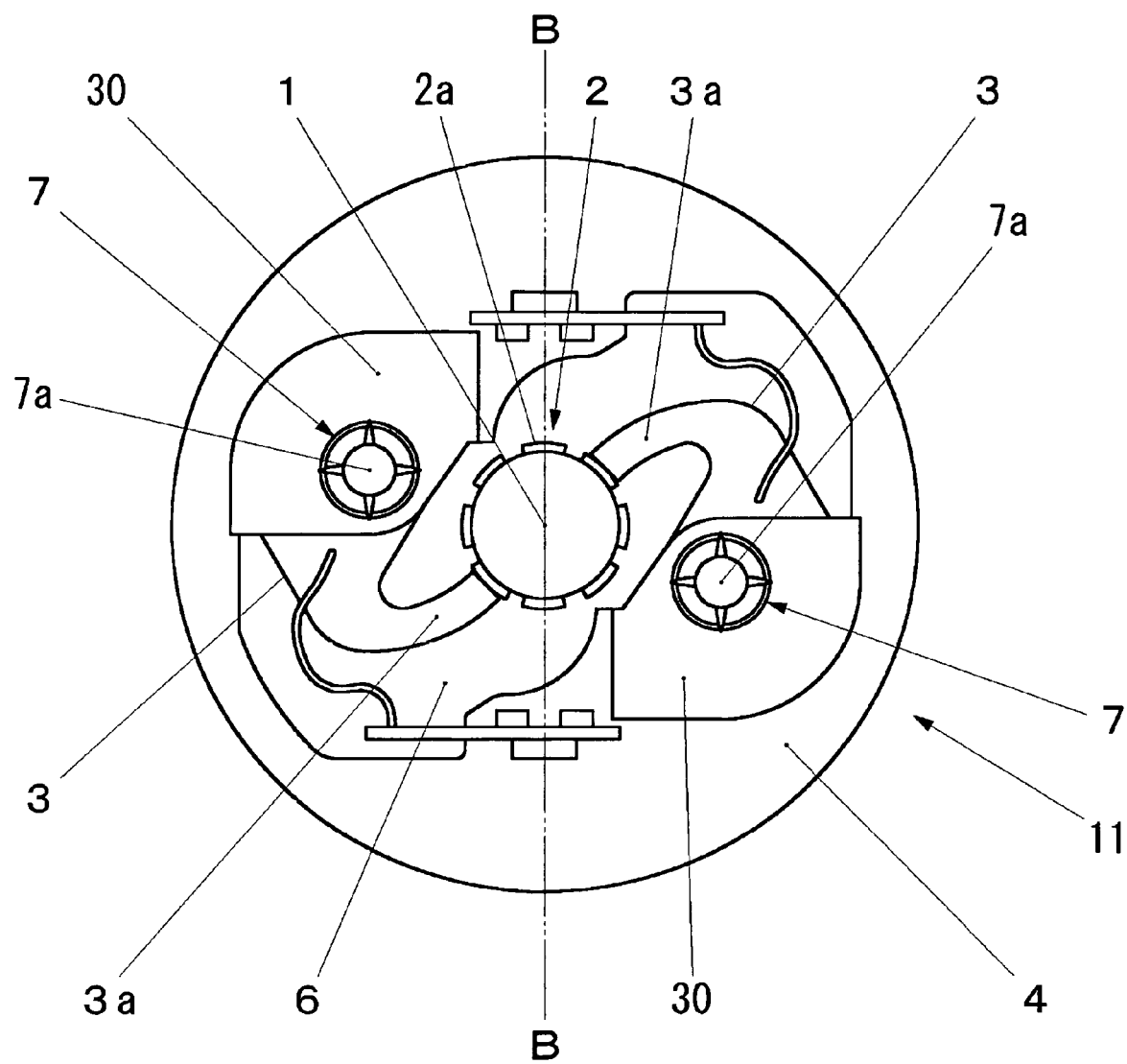
FIG. 1 is a plan view showing a brush device of the first embodiment of the present invention.
Figure 2:
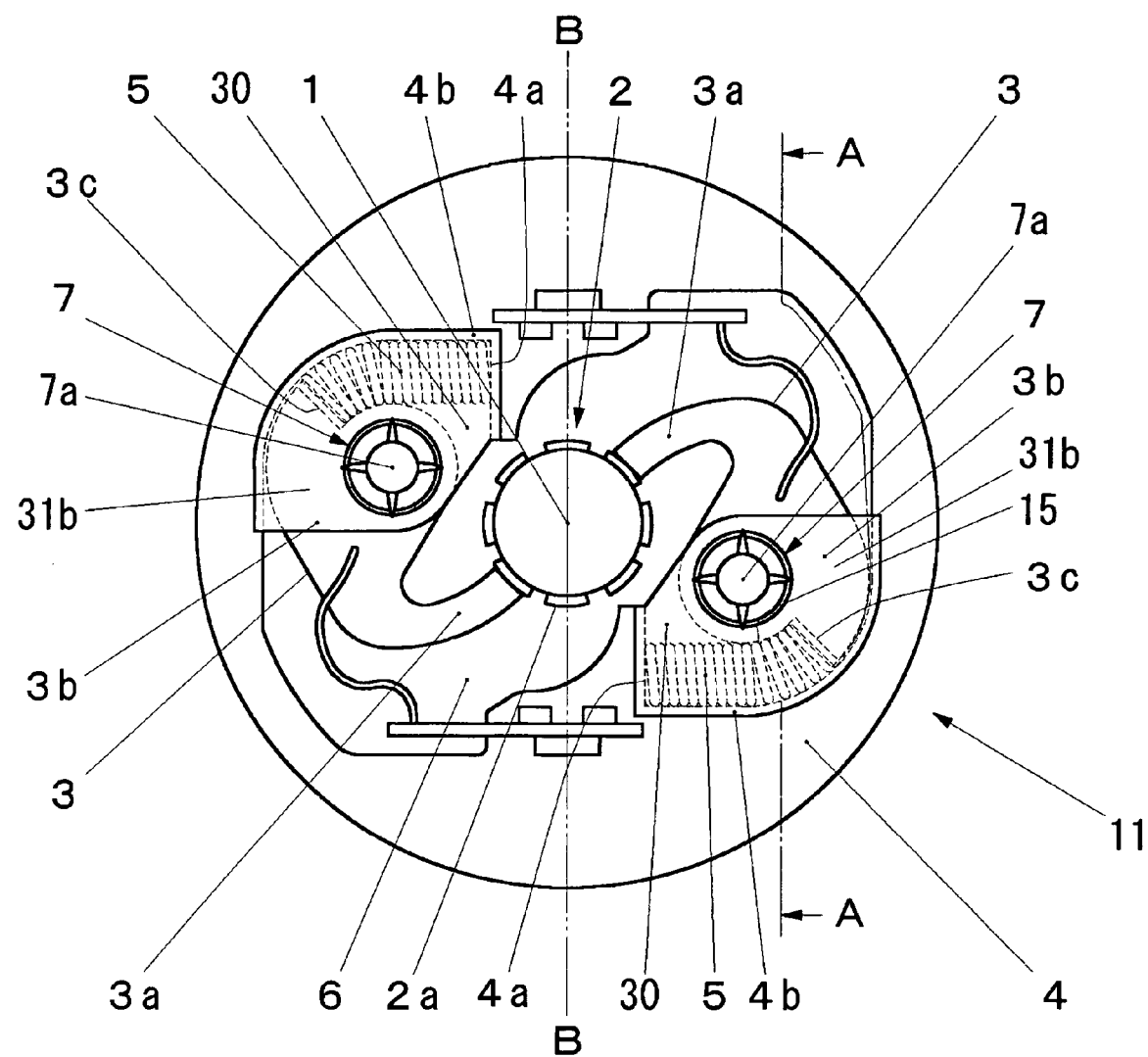
FIG. 2 is a plan view showing with broken lines the locations covered by a cover plate of FIG. 1.
Figure 3:
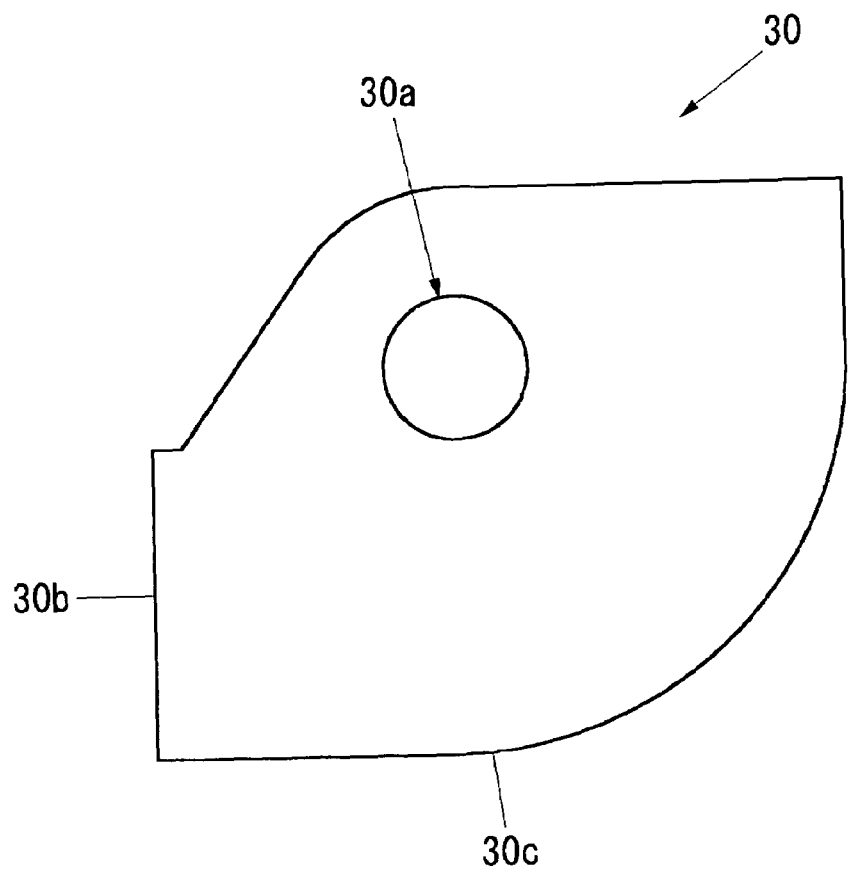
FIG. 3 is a plane view showing the exterior of the cover plate attached to the brush device.
Figure 4:
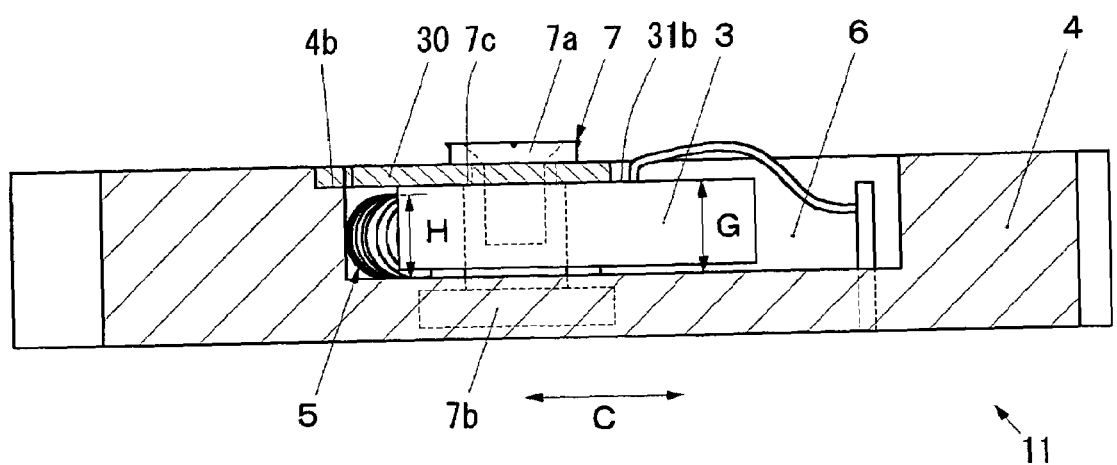
FIG. 4 is a partial side sectional view of the brush device of FIG. 2, taken along the dash-doted line A—A.
Figure 5:
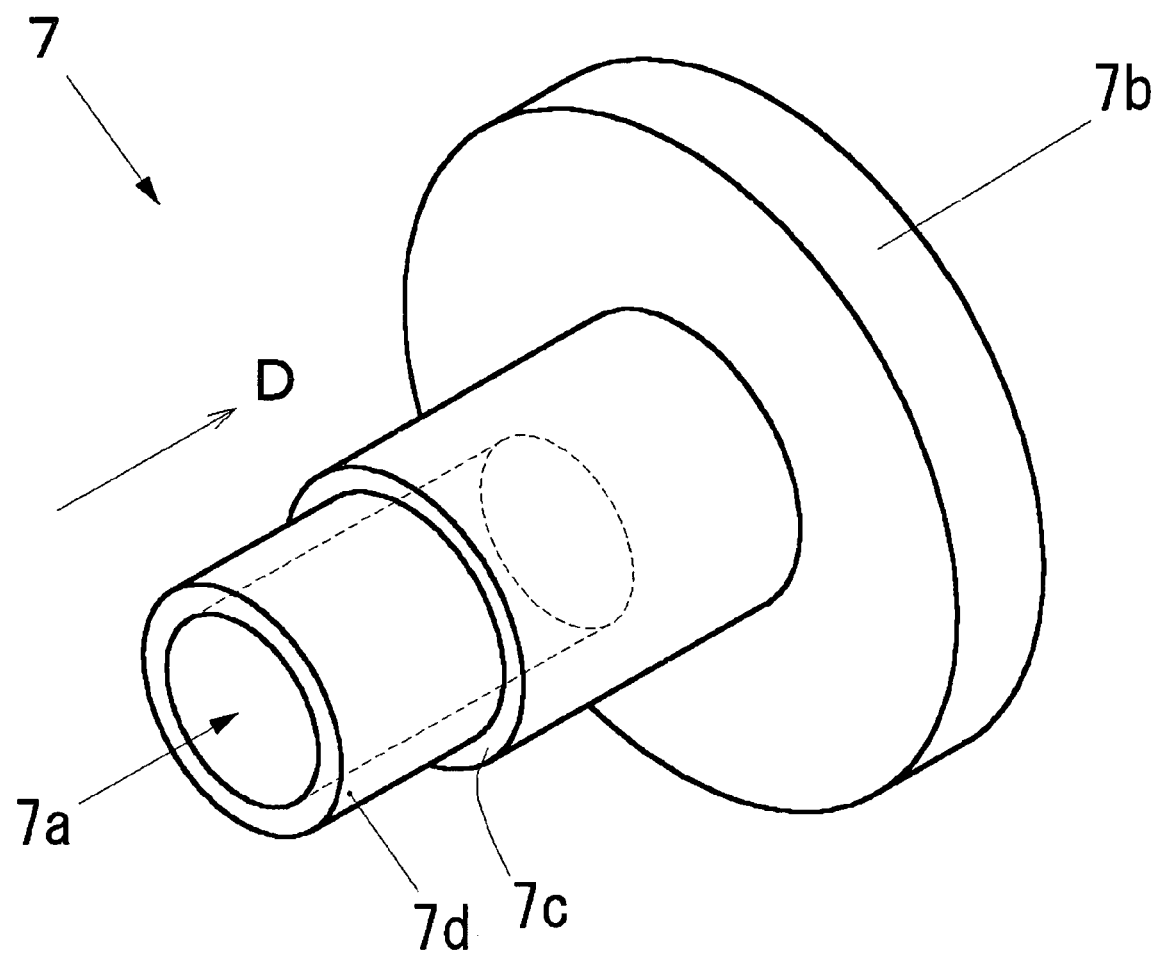
FIG. 5 is a perspective view showing a support post.
Figure 6:
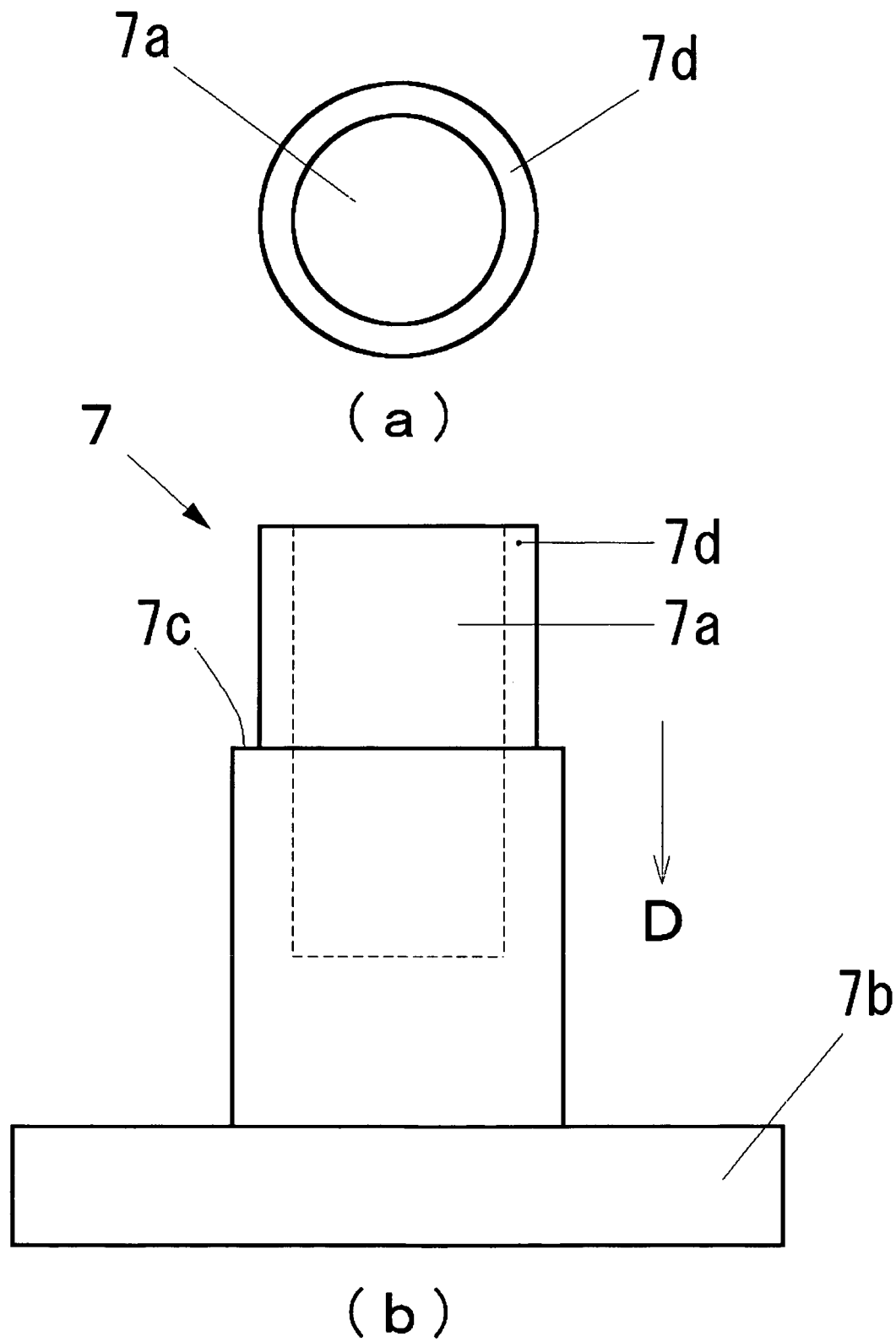
FIG. 6(a) is a schematic plan view showing an end face 7d in FIG. 5.
FIG. 6(b) is a side view of the support post in FIG. 5.
Figure 7:
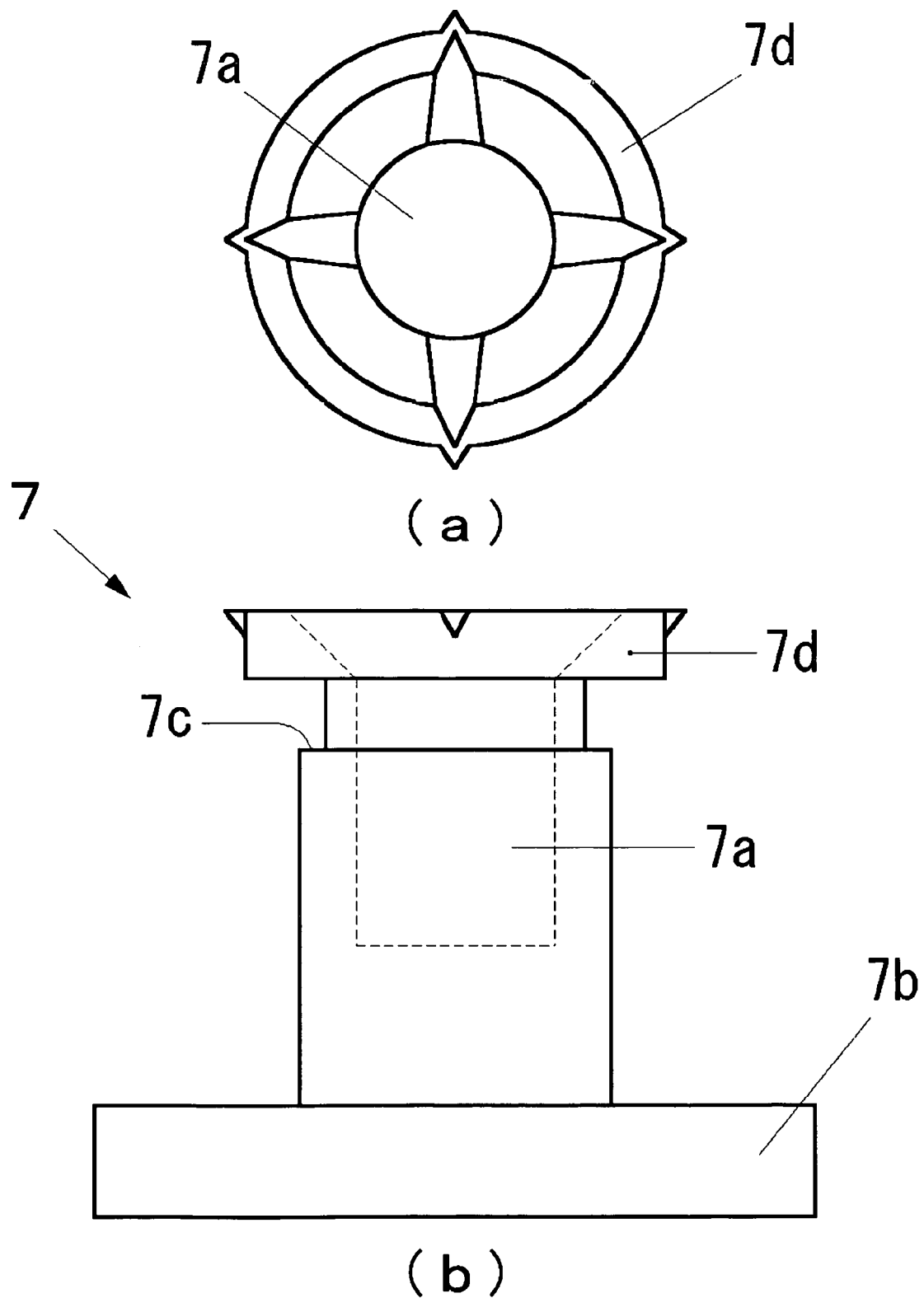
FIG. 7(a) is a schematic plan view showing the end face 7d when the end face 7d has been spread with a caulking iron.
FIG. 7(b) is a side view of the support post when the end face 7d has been spread with the caulking iron.
Figure 8:
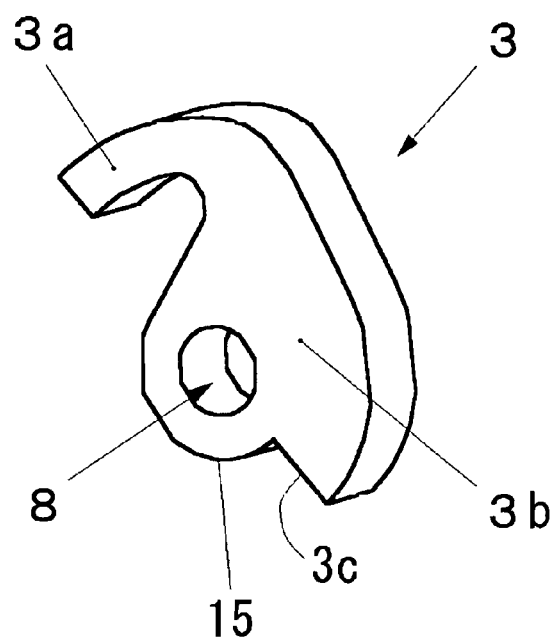
FIG. 8 is a perspective view of the brush used in the brush device in FIGS. 1, 2 and 4.
Figure 9:
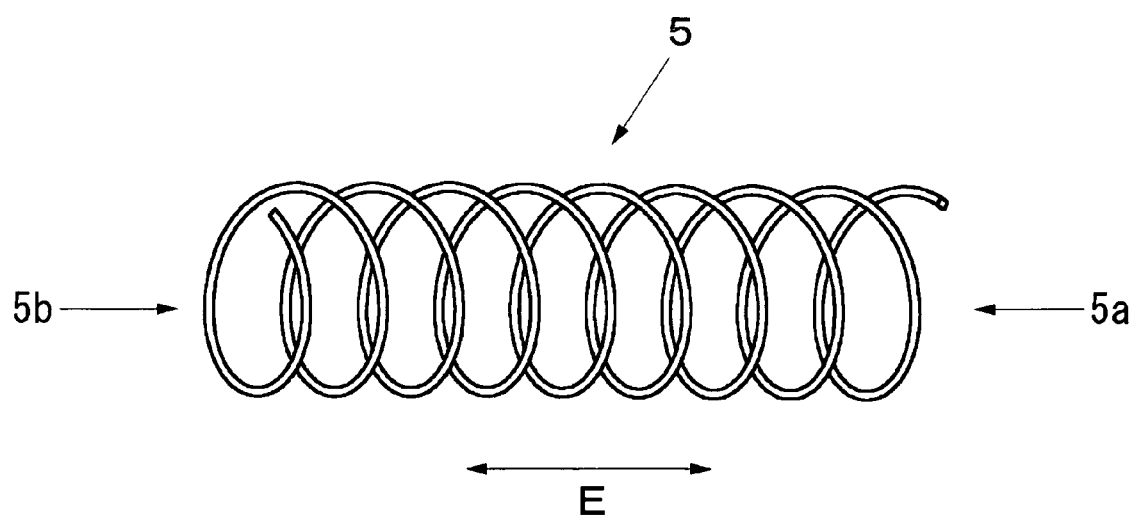
FIG. 9 is a perspective view of a coil spring

Hereinafter, the first embodiment of the brush device of the present invention will be described referring to FIGS. 1 through 9. Now, for parts that are the same as those of the prior art, the same reference numerals are used. FIGS. 1 and 2 are plan views of a brush device 11 of the first embodiment. FIG. 3 is a plan view showing the exterior of a cover plate 30 installed on a brush device 11. FIG. 4 is a partial cross sectional view of a brush holder 4 of the brush device 11, taken along the dash-dotted line A—A in FIG. 2. FIGS. 5 through 7 show a support post 7 that fixes a brush 3 in place. FIG. 8 is a perspective view of the brush 3. And FIG. 9 is a perspective view of a coil spring 5 used in the brush device 11.

As shown in FIGS. 1 and 2, there is in the flat surface of a brush holder 4 a recess 6 that accommodates the brushes 3 and the coiled springs 5 shown by broken lines in FIG. 2. The recess 6 has 180 degree rotational symmetry centered on the axis B—B that runs through the center of the brush holder 4. In a brush base 3b of each brush 3 there is a hole 8 for insertion of the support post 7 as shown in FIG. 8. The brush 3 is formed in part in an arc shape, and has a guide 15 that holds at least a portion of the winding of the coil spring 5. Reference numeral 1 denotes a motor shaft, placed so that it can rotate, of the motor with a brush that is not shown. A commutator 2 comprises a number of commutator blades 2a mounted equidistant around the outer periphery of the motor shaft 1.

As shown in FIGS. 1, 2 and 8, the brush 3 is formed in substantially a V shape, with a brush arm 3i a, which has a contact face that rubs against the commutator 2, and the brush base 3b connected as a single unit. The brush 3 can be made with only the brush arm 3a being carbon, but this embodiment is explained as an example of having the brush 3 as a whole made of carbon. Now, the brush arm 3a is formed in substantially the shape of a gentle arc.

A brush 3 is installed in the recess 6 as shown in FIG. 4 and in FIGS. 5 and 6. After a projection 7b that is formed on the other end of the support post 7 is insert molded into the brush holder 4, the hole 8 in the brush 3 is fitted over the support post 7 shown in FIGS. 5 and 6. The support post 7 is molded of a metallic material such as brass. As shown in FIG. 4 and FIGS. 5 and 6, the support post that is fixed into the brush holder 4 by insert molding is formed with a hollow cylinder as the end 7d that is positioned by a flat surface 31b of the brush base 3b. That is, it is formed as a substantially cylindrical post with a bore 7a that extends part way along the length (the direction of arrow D in FIGS. 5 and 6) of the support post 7.

One end 5a of the winding of the coil spring 5 shown in FIG. 9 is stopped by a stop face 3c formed in advance on the brush 3, and the other end 5b is stopped by a step 4a established in the shape that makes up the recess 6. The longitudinal direction of the coil spring 5 (the direction of arrow E in FIG. 9) is aligned with the direction of the flat surface of the brush holder 4 (the direction of arrow C in FIG. 4), and the coil spring 5 is accommodated within the recess 6 with a part of the winding following at least one of the guide 15 and the recess 6.

Because the coil springs 5 stretch out along the guide 15 and the wall of the recess 6, the two brushes 3 rotate around the support posts 7 in the direction of the commutator 2, and the contact faces at the tips of the brush arms 3a are impelled toward and have contact with the commutator blades 2a.

After the hole 8 is fitted over the support post 7, a cover plate 30 like that shown in FIGS. 1 through 4 is fastened to the support post 7. The cover plate 30 has in it a hole 30a that fits over the support post 7, and by fitting this hole 30a over the support post 7 it is possible to mount the cover late 30 on the brush holder 4. At that time, the flat surface of the cover plate 30 adjacent to the hole 30a is received by a step 7c on the outer periphery of the support post 7 (see FIGS. 4 through 6). Meanwhile, the flat surface of edges 30b and 30c of the cover plate 30 are received by a step 4b that is a part of the brush holder 4 shown in FIGS. 2 and 4. The step 7c and the step 4b are constituted so as to have the same height in the direction perpendicular to the flat surface of the brush holder 4 (the direction of the arrow C in FIG. 4). The height of the step 7c and the step 4b is preferably 0.1 to 0.2 mm higher than the separation between the flat surface 31b and the bottom of the recess when the brush 3 is fitted on the support post 7 (dimension G in FIG. 4) and the height of the winding of the spring 5 (dimension H in FIG. 4).

The size of the cover plate 30 is determined so that when installed on the brush holder 4 as shown in FIGS. 1 and 2, it will cover and conceal the winding of the spring 5 when viewed from the direction perpendicular to the direction of the surface of the brush holder 4 (the direction of the arrow C in FIG. 4). More preferably, it is determined so that it will cover and conceal the winding even when the winding extends as the brush arm 3a wears away.

After the cover plate 30 is in place, one end of the support post 7 is fixed to the flat surface of the cover plate 30, as shown in FIGS. 4 and 7, by spreading the end 7d with a caulking iron. During the fixing with the caulking iron, the cover plate 30 is received by the step 7c and the step 4b, and so the cover plate 30 is prevented from applying excessive pressure to the brush 3. Accordingly, it is possible for the brush 3 to rotate freely as impelled by the spring 5.

When the motor with a brush in which the brush device 11 is mounted is started up, the motor shaft 1 that is a rotor begins to revolve, and electrical conductivity is established by the rubbing together of the commutator 2 and the brushes 3, so that the motor can be driven. When the motor has operated for a long period, the contact faces of the brushes 3 are worn away by friction with the commutator 2 and the brush arms 3a gradually grow shorter, but because the coil springs 5 constantly impel the brushes 3 toward the commutator 2, as described above, the electrical conductivity between the commutator 2 and the brushes 3 is maintained without interruption.

Moreover, the support post 7 that supports the brush 3 has one end fixed in place by spreading with the caulking iron and the other end is fixed by insert molding into the brush holder 4. In other words, the means used for fixing both ends of the support post 7 are means in which the fixing strength does not change even in the presence of the heat that accompanies operation of the motor, and so both ends remain firmly fixed even when the motor has been driven for a long period. Accordingly, the brushes 3 and the commutator blades 2a are always in contact, and so it is possible to increase the electrical and mechanical reliability of contact between the commutator 2 and the brushes 3 when the motor is driven for a long period.

Further, by using the caulking iron to fix the support post 7 at the flat surface 31b of the brush base 3b, it is possible to assure adequate fixing strength relative to the fixing of the other end by insert molding. Accordingly, it is possible to firmly fix both ends of the support post 7, and so the support of the brush 3 is firm. It is possible, as a result, to keep the brush 3 and the commutator blades 2a in contact at all times, and so the electrical and mechanical reliability of contact between the brushes 3 and the commutator 2 in motors driven over long periods can be increased.

In addition, since the cover plate 30 is fixed to the support post 7 so as to cover the winding of the spring 5, it is possible to control the pushing up of the spring 5. Accordingly, it is possible to keep the contact face of the brush rubbing against the commutator blades 2*a* with the desired impulse.

Herein, this embodiment can be varied in numerous ways on the basis of technical considerations. For example, the cover plate 30 could be omitted and the end 7*d* could be spread with the caulking iron and fixed to the flat surface 31*b*. Or the support post 7 could be a solid post without the hole 30*a* and the cover plate 30 could be attached to the brush device 11 by inserting that post into the hole 30*a*. Needless to say, however, this embodiment is optimum from the perspective of obtaining both the results of improving electrical and mechanical reliability and keeping the spring 5 from pushing up.

Embodiment 2

Figure 10:
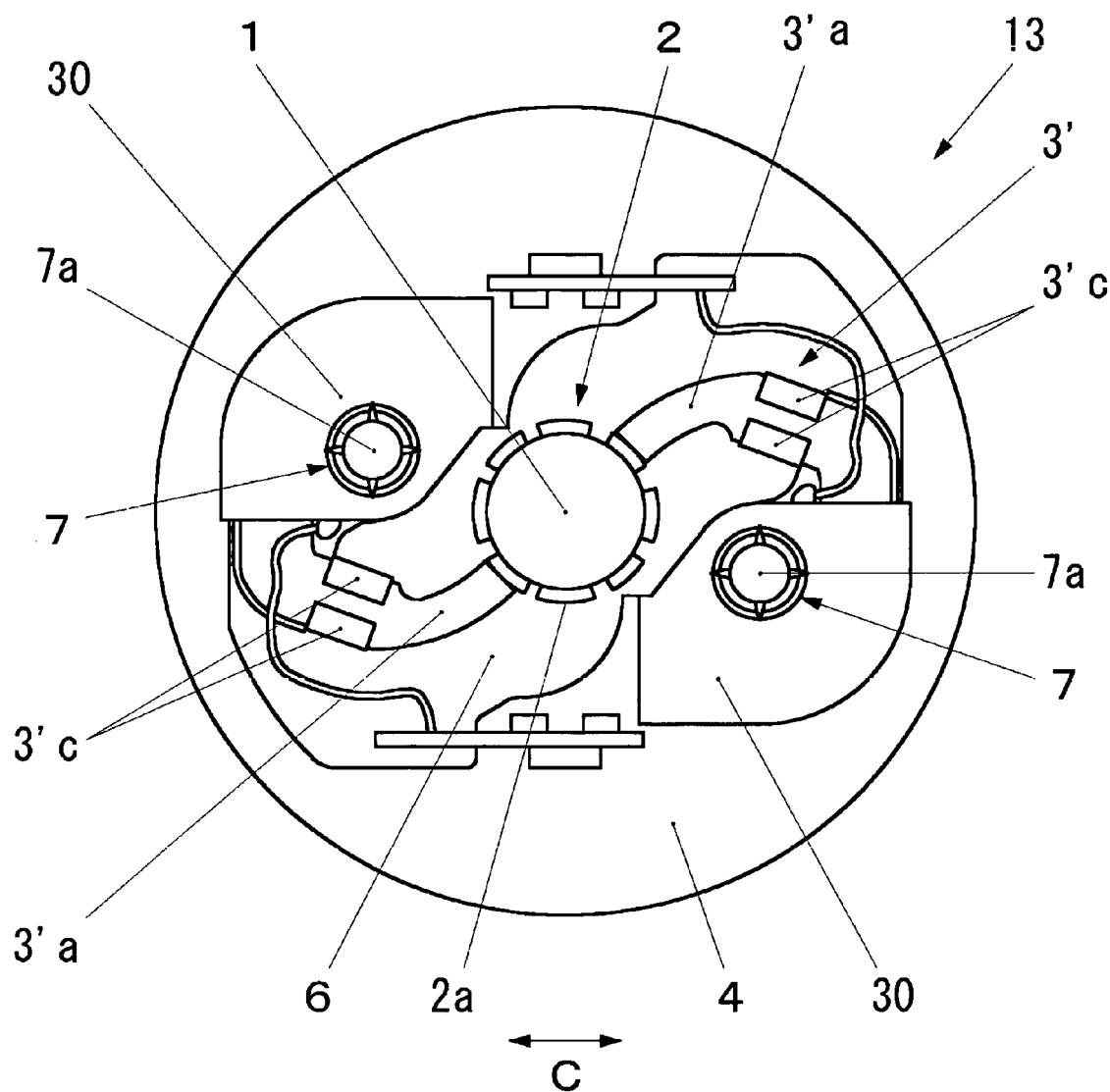
FIG. 10 is a plan view showing a brush device of the second embodiment of the present invention.
Figure 11:
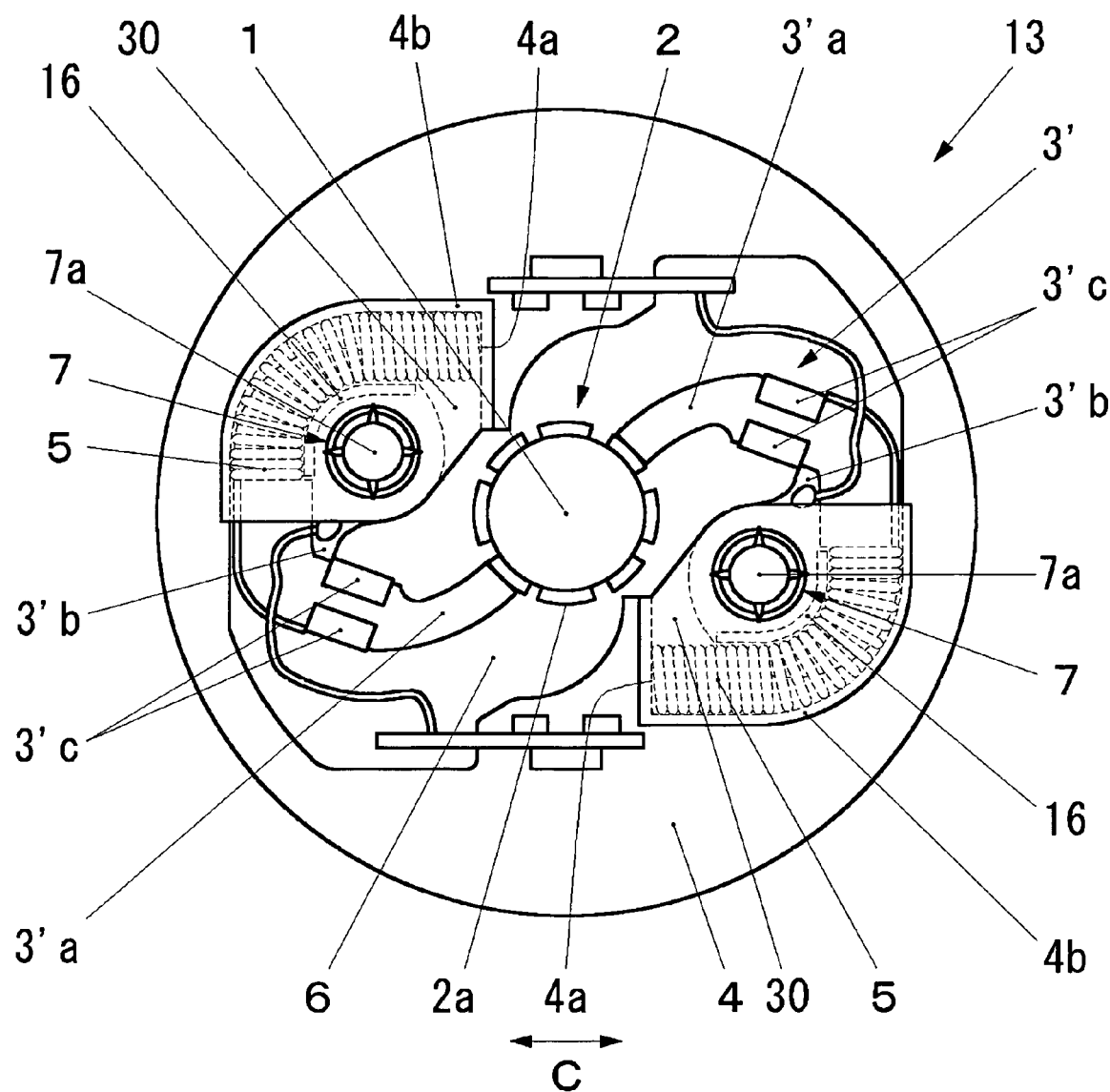
FIG. 11 is a plan view showing with broken lines the locations covered by the cover plate of FIG. 10.
Figure 12:
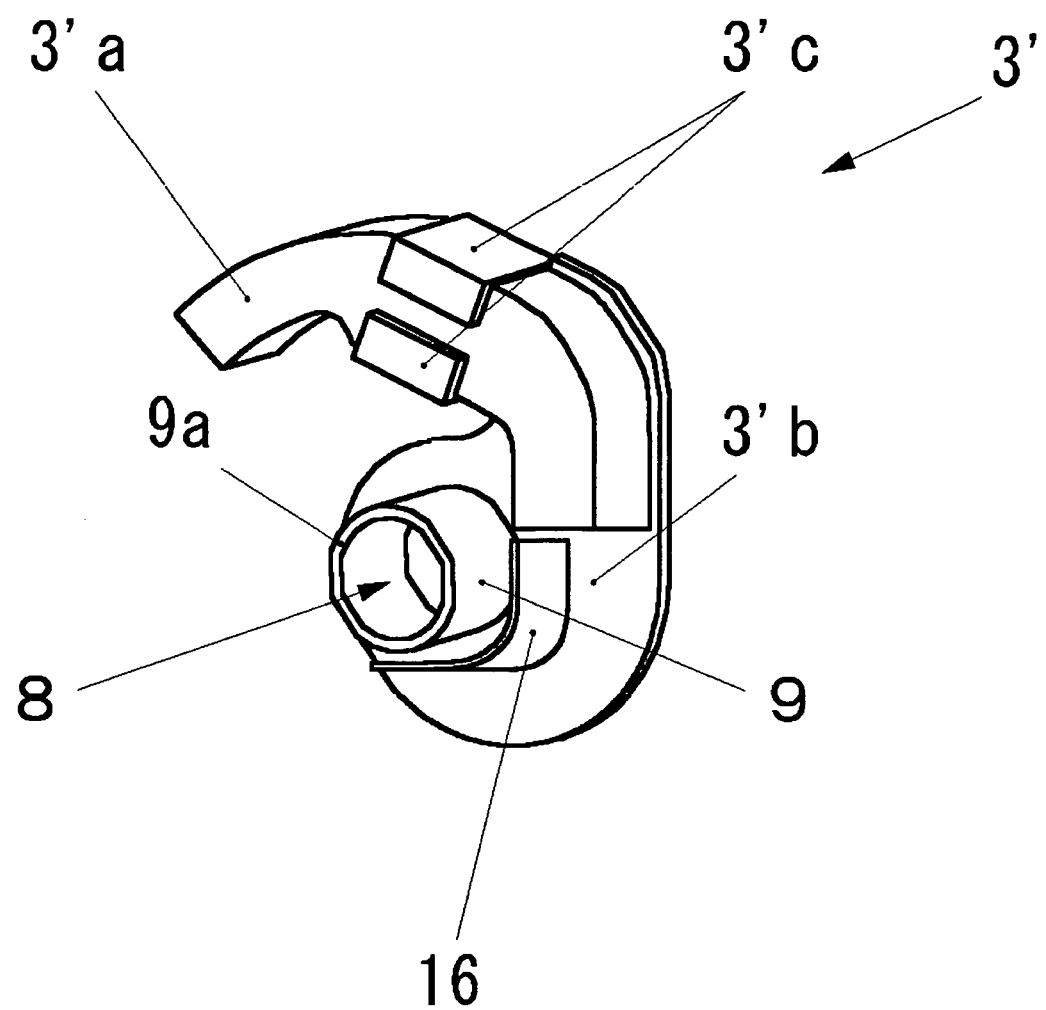
FIG. 12 is a perspective view of the brush used in the brush device of FIGS. 10 and 11.

Next, the second embodiment of the brush device of the present invention will be described referring to FIGS. 10 through 12. FIGS. 10 and 11 are plan views of a brush device 13 of the second embodiment, and FIG. 12 is a perspective view of a brush 3' in the brush device 13 of FIGS. 11 and 12. Now, the description of the second embodiment is limited to those points that differ from the first embodiment; structural parts which are the same as those in the first embodiment are given the same reference numerals, and duplicate descriptions are omitted or simplified.

As shown in FIGS. 11 and 12, a brush base 3'*b* of the brush 3' is made of a metallic sheet material. It has a hole 8 for insertion of the support post 7 in the designated location, and an insertion tube 9 for the insertion of the support post 7 is formed as a single unit with the brush base 3'*b*, extending from the hole 8. The brush arm 3'*a* that has a contact face that rubs against the commutator 2 is a separate piece. By clamping the brush arm 3'*a* with a contact face and an opposite end in a damper 3'*c* on the brush base 3'*b*, the brush 3' that is substantially V-shaped as a whole is formed. In this embodiment, the brush arm 3'*a* is made of carbon and is formed in the shape of a gentle arc. The hole 8, the insertion tube 9, and the damper 3'*c* of the brush base 3'*b* are formed as a unit by press processing of sheet metal.

As in the first embodiment, the support post 7 is fixed to the brush holder 4 by insert molding, and then the support post 7 is inserted into the hole 8 and inside the insertion tube 9, by which means the brush 3' is accommodated in the recess 6 and is free to rotate around the support post 7. When the brush 3' is accommodated in the recess 6, the step 7*c* of the support post 7 is higher than the end 9*a* of the insertion tube 9 (see FIG. 12). One end 5*a* (see FIG. 9) of the winding of the coil spring 5 is stopped by the end face of the brush arm 3'*a* near the clamper, and the other end 5*b* is stopped by the step 4*a* that is part of the shape of the recess 6.

Next, the longitudinal direction of the coil spring 5 (the direction of the arrow E in FIG. 9) is aligned with the direction of the surface of the brush holder 4 (the direction of the arrow C in FIGS. 10 and 11), and the coil spring 5 is accommodated within the recess 6 with a part of the winding of the coil spring 5 following at least one of the wall of the recess 6 and a guide 16 that is a single unit with the brush base 3'*b*.

Because this coil spring 5 stretches out along the guide 16 and the wall of the recess 6, when the two brushes 3' rotate around the support posts 7 in the direction of the commutator 2, the contact faces at the tip of the brush arms 3'*a* are impelled toward and have contact with the commutator blades 2*a*.

Next, the cover plate 30 is attached. As in the first embodiment, the size of the cover plate 30 is determined so that when installed on the brush holder 4 as shown in FIGS. 1 and 2, it will cover and conceal the winding of the spring 5 when viewed from the direction perpendicular to the direction of the surface of the brush holder 4. More preferably, it is determined so that it will cover and conceal the winding even when the winding extends as the brush arm 3*a* wears away. When the plate is placed in the recess 6, the flat surface of the cover plate 30 adjacent to the hole 30*a* is received by a step 7*c* on the outer periphery of the support post 7 (see FIGS. 5 through 7). In addition, the flat surface of the edges 30*b* and 30*c* of the cover plate 30 are received by the step 4*b* that is a part of the brush holder 4. As in the first embodiment, the step 7*c* and the step 4*b* are constituted so as to have the same height in the direction perpendicular to the flat surface of the brush holder 4 (the direction of the arrow C in FIGS. 10 and 11). The height of the step 7*c* and the step 4*b* when the insertion tube 9 is fitted to the support post 7 is preferably 0.1 to 0.2 mm higher than the end face 9*a* of the insertion tube 9 and the height of the winding of the spring 5 (dimension H in FIG. 4).

After the cover plate 30 is in place, one end of the support post 7 is fixed to the flat surface of the cover plate 30 by spreading the end 7*d* with the caulking iron as shown in FIG. 7. During the fixing with the caulking iron, the cover plate 30 is received by the step 7*c* and the step 4*b*, and so the cover plate 30 is prevented from applying excessive pressure to the brush 3'. Accordingly, it is possible for the brush 3' to rotate freely as impelled by the spring 5.

As in the first embodiment, both ends of the support post 7 are fixed by means in which the fixing strength does not change even in the presence of the heat that accompanies operation of the motor, and so both ends remain firmly fixed even when the motor has been driven for a long period, and the brushes 3 and the commutator blades 2*a* are always in contact. Thus, it is possible to increase the electrical and mechanical reliability of contact between the commutator 2 and the brushes 3 when the motor is driven for a long period.

Further, by using the caulking iron to fix one end of the support post 7, it is possible to assure adequate fixing strength, and both ends of the support post 7 can be firmly fixed, and so the support of the brush 3 is firm. It is possible, as a result, to keep the brush 3 and the commutator blades 2*a* in contact at all times, and so the electrical and mechanical reliability of contact between the brushes 3 and the commutator 2 in motors driven over long periods can be increased.

In addition, since the cover plate 30 is fixed to the support post 7 so as to cover the winding of the spring 5, it is possible to control the pushing up of the spring 5. Accordingly, it is possible to keep the contact face of the brush rubbing against the commutator blades 2*a* with the desired impulse.

In addition to the effects described above, in this embodiment it is possible to reduce thickness by forming the brush base 3'*b* of a sheet material and, taking advantage of that reduced thickness, to have the longitudinal direction of the coil spring 5 in almost the same plane as the surface of the brush holder 4, so that the windings of the coil spring 5 do not protrude beyond the thickness of the brush 3'.

Further, because the brush arm 3'*a* and the brush base 3'*b* are separate pieces in this embodiment, it is possible to replace just the brush arm when it becomes worn, and there is no need to replace the entire brush 3' and maintenance characteristics of the brush device are superior to that extent.

Herein, this embodiment can be varied in numerous ways on the basis of technical considerations. For example, the cover plate 30 could be omitted and the end 7*d* could be spread with a caulking iron and fixed to the end face 9*a* of the insertion tube 9. Or the support post 7 could be a solid post without the hole 30*a* and the cover plate 30 could be attached to the brush device. Needless to say, however, this embodiment is optimum from the perspective of obtaining both the results of improving electrical and mechanical reliability and keeping the spring 5 from pushing up.

Embodiment 3

Figure 13:
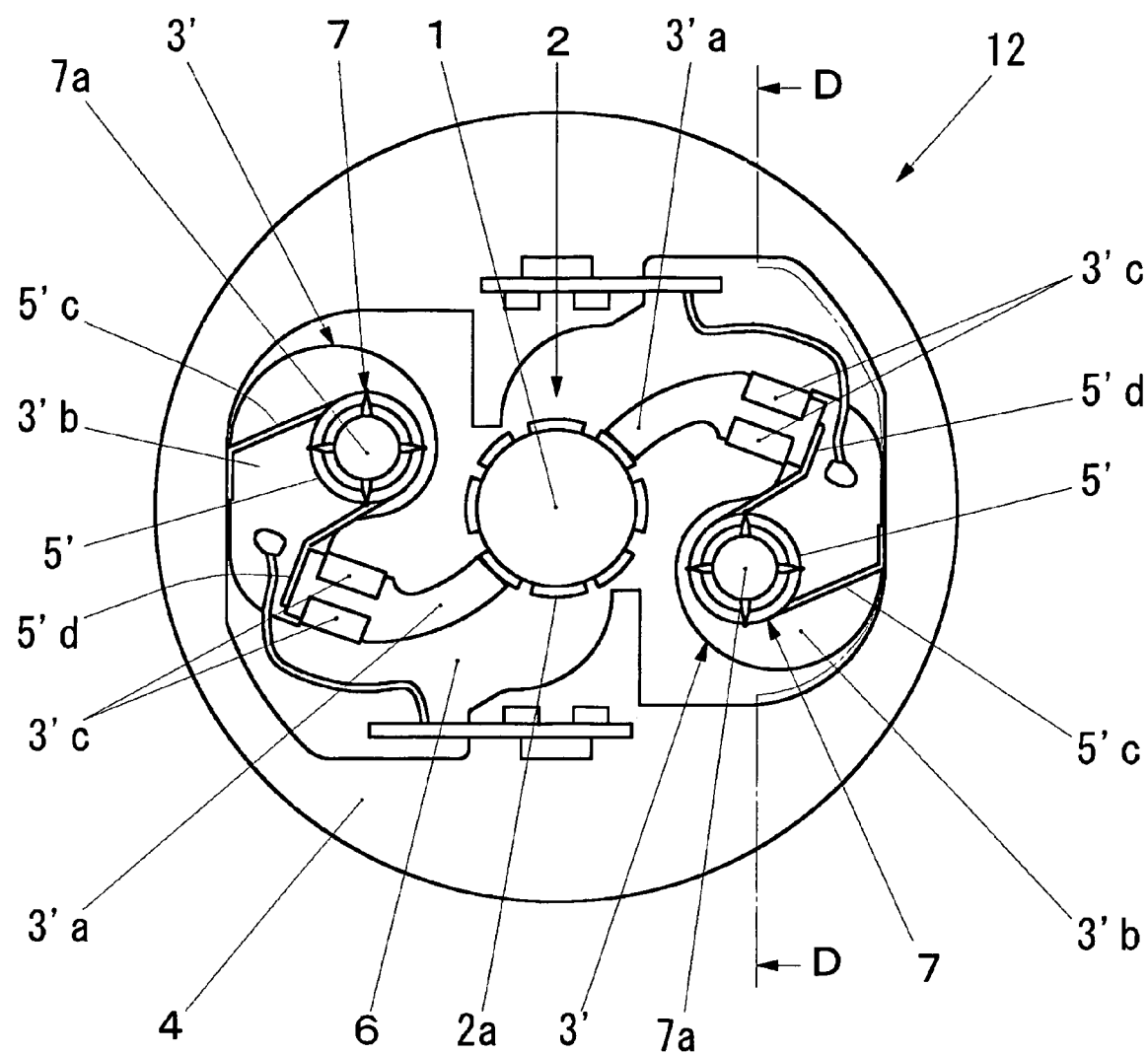
FIG. 13 is a plan view showing a brush device of the third embodiment of the present invention.
Figure 14:
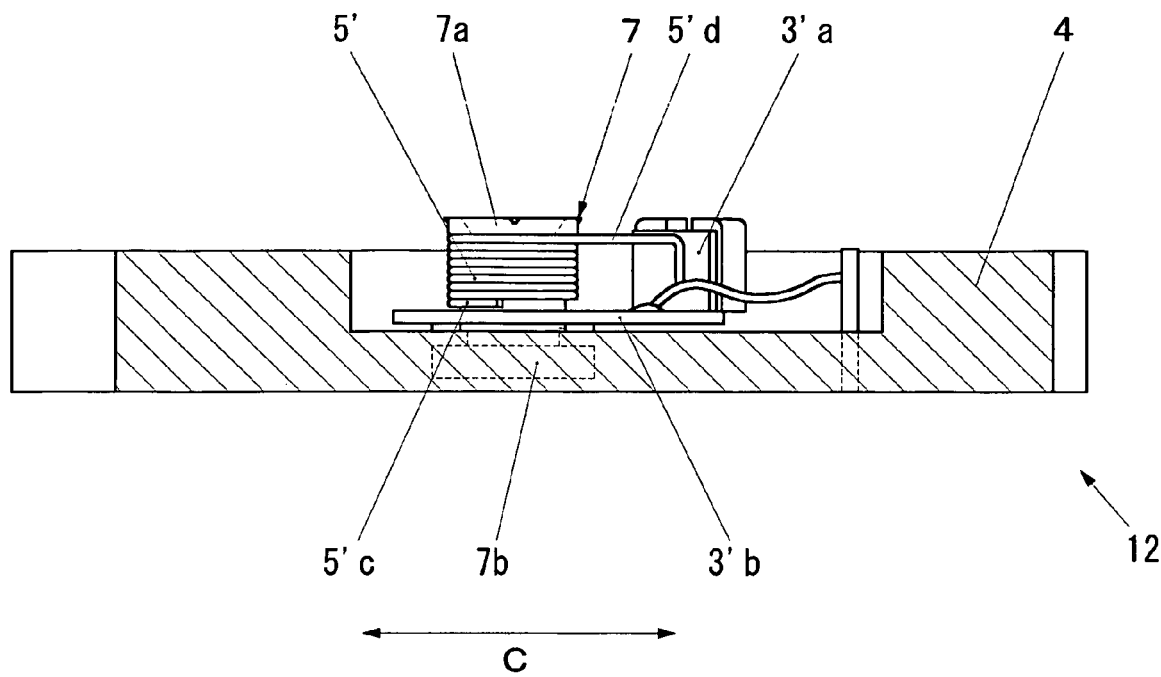
FIG. 14 is a partial side sectional view of FIG. 13, taken along the dash-dotted line D—D.

Next, the third embodiment of the brush device of the present invention will be described referring to FIGS. 13 and 14. FIG. 13 is a plan view of a brush device 12 of the third embodiment. FIG. 14 is a partial cross sectional view of the brush holder 4 of the brush device 12 of FIG. 13, taken along the dash-dotted line D—D. Herein, the description of the third embodiment is limited to those points that differ from the first and second embodiments. Parts which are the same as those in these embodiments are denoted by the same reference numerals, and duplicate descriptions are omitted or simplified.

As shown in FIG. 13, the brush base 3'*b* of the brush 3' is made of a metallic sheet material, and it has a hole (not illustrated) for insertion of the support post 7 in the designated location, and an insertion tube (not illustrated) for the insertion of the support post 7 is formed as a single unit with the brush base 3'*b*, extending from the hole 8. The brush arm 3'*a* is a separate piece; by clamping it with the damper 3'*c*, the brush 3' that is substantially V-shaped as a whole is formed. In this embodiment, the brush arm 3'*a* is made of carbon and is formed in the shape of a gentle arc.

After the projection 7*b* that forms one end of the support post 7 is fixed to the brush holder 4 by insert molding as shown in FIG. 14, then the support post 7 is inserted into the hole and inside the insertion tube, by which means the brush 3' is accommodated in the recess 6 and is free to rotate around the support post 7. A torsion coil spring 5' is fitted over the outer periphery of the insertion tube. The end 5'*c* of spring wire that extends from one side of the winding of the torsion coil spring 5' is stopped by the brush holder 4, and the end 5'*d* of spring wire that extends from the other side is stopped by the end face of the brush arm 3'*a* that is part of the brush 3', near the clamper.

By means of the elastic force of this torsion coil spring 5', the two brushes 3' rotate around the support posts 7 in the direction of the commutator 2, and the contact faces at the tips of the brush arms 3'*a* are impelled toward and have contact with the commutator blades 2*a*.

Next, the end 7*d* (see FIGS. 5 through 7) of the hollow cylinder of the support post 7 is spread with the caulking tool, and the end of the support post 7 is fixed to the end face 9*a* (see FIG. 12) of the insertion tube. Accordingly, as in the embodiments described above, both ends of the support post 7 are fixed by means in which the fixing strength does not change even in the presence of the heat that accompanies operation of the motor, and so both ends remain firmly fixed even when the motor has been driven for a long period, and the brushes 3' and the commutator blades 2*a* are always in contact. Thus, it is possible to increase the electrical and mechanical reliability of contact between the commutator 2 and the brushes 3 when the motor is driven for a long period.

Further, using the caulking iron to fix one end of the support post 7, it is possible to assure adequate fixing strength, and both ends of the support post 7 can be firmly fixed, and so the support of the brush 3' is firm. It is possible, as a result, to keep the brush 3' and the commutator blades 2*a* in contact at all times, and so the electrical and mechanical reliability of contact between the brushes 3' and the commutator 2 in motors driven over long periods can be increased.

In addition to the effects described above, in this embodiment the thickness is reduced by forming the brush base 3'*b* of the brush 3', of a sheet material. In this way, even though the longitudinal direction of the torsion coil spring 5' is perpendicular to the direction of the face of the brush holder 4 (arrow C), the winding of the torsion coil spring 5' does not extend above the thickness of the brush arm 3'*a*. Accordingly, it is possible to form a brush device that is thinner than the conventional brush device.

Further, because the brush arm 3'*a* is a separate piece in this embodiment, it is possible to replace just the brush arm when it becomes worn, and there is no need to replace the entire brush 3' and maintenance characteristics of the brush device are superior to that extent.

Figure 15:
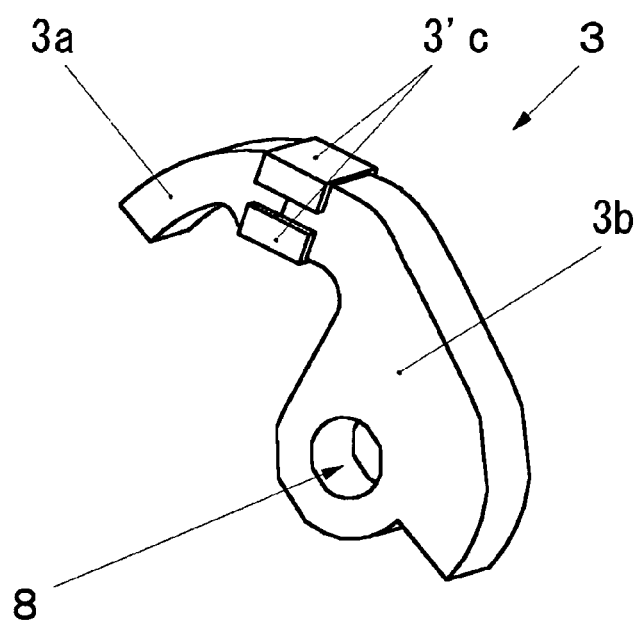
FIG. 15 is a perspective view showing another embodiment of the brush used in the brush device of the present invention.
Figure 16:
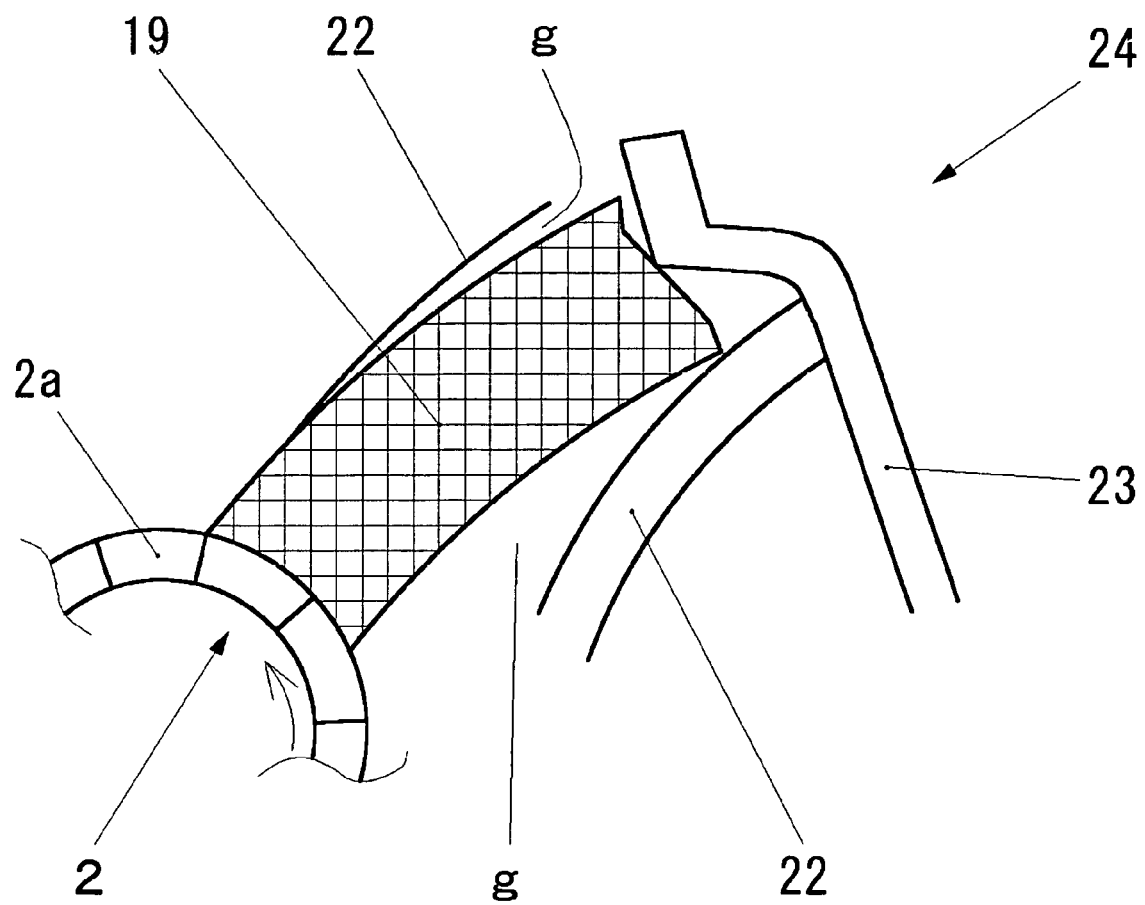
FIG. 16 is a plan view showing the conventional brush structure.
Figure 17:
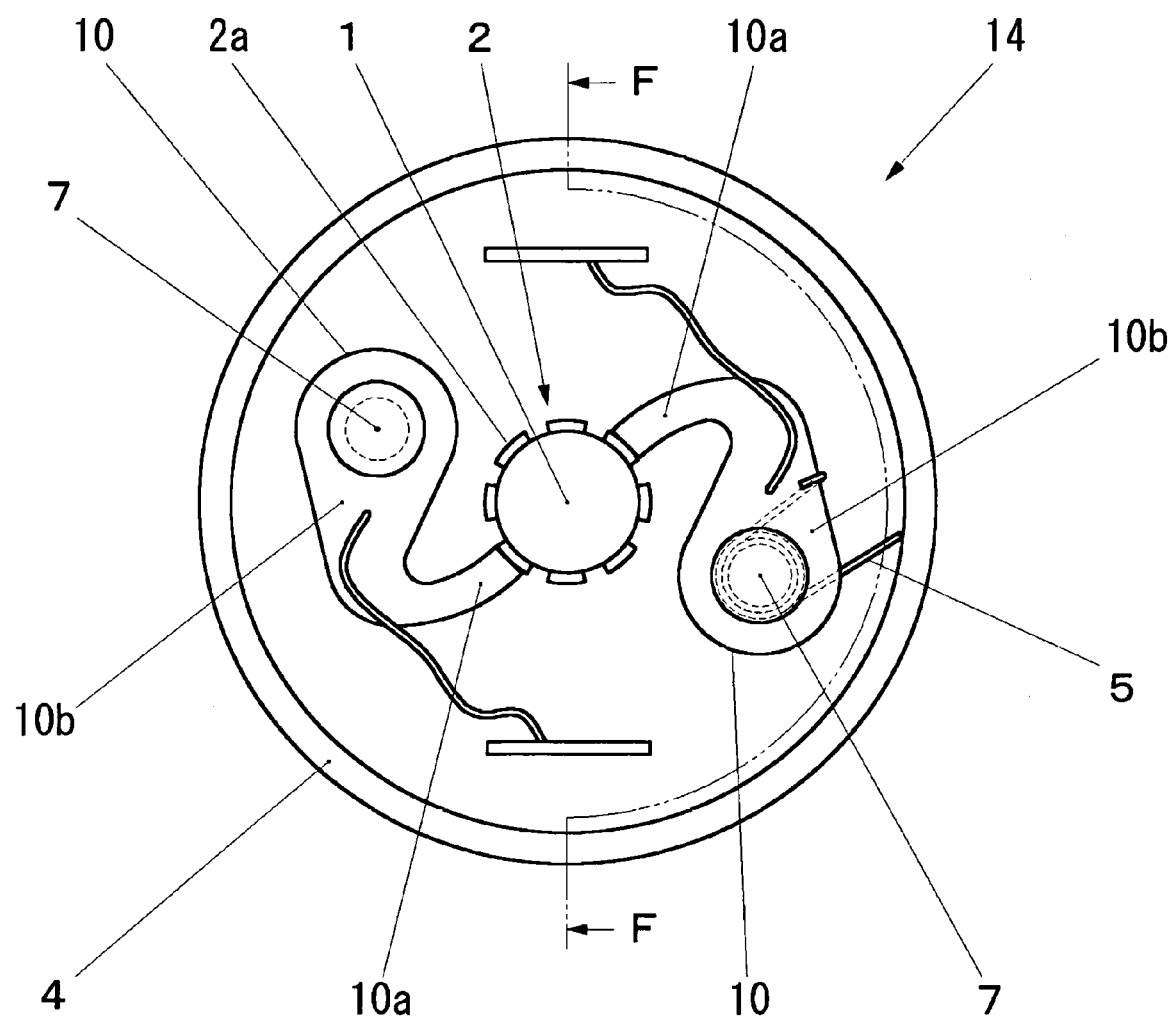
FIG. 17 is a plan view showing another conventional brush device.
Figure 18:
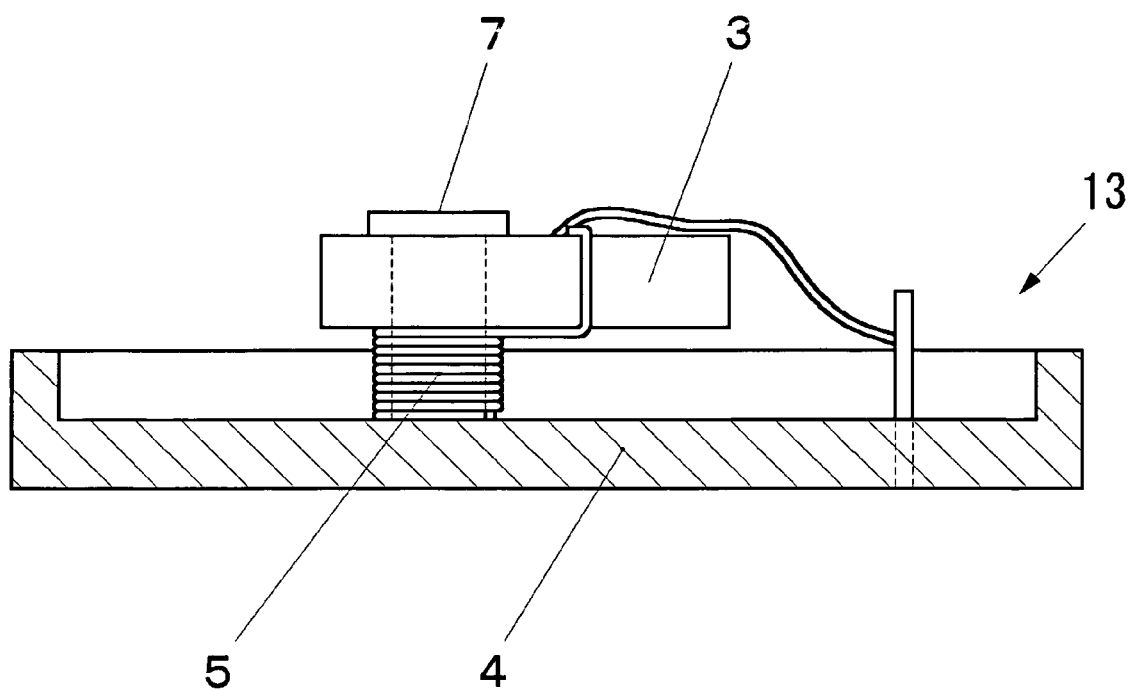
FIG. 18 is a schematic partial side sectional view of FIG. 17, taken along the dash-doted line F—F.
Figure 19:
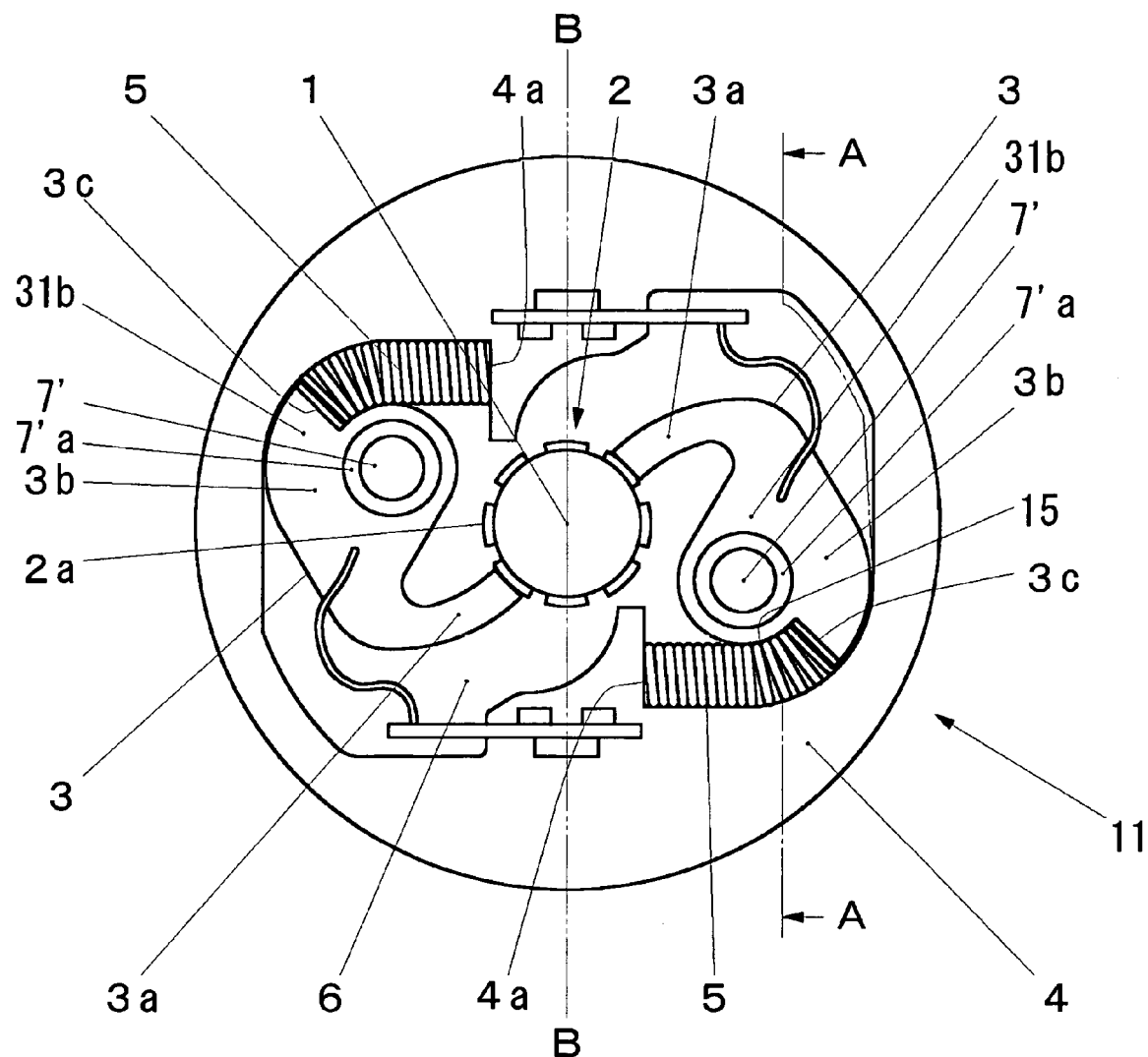
FIG. 19 is a plan view showing the content of the brush device of the application by the present applicants.
Figure 20:
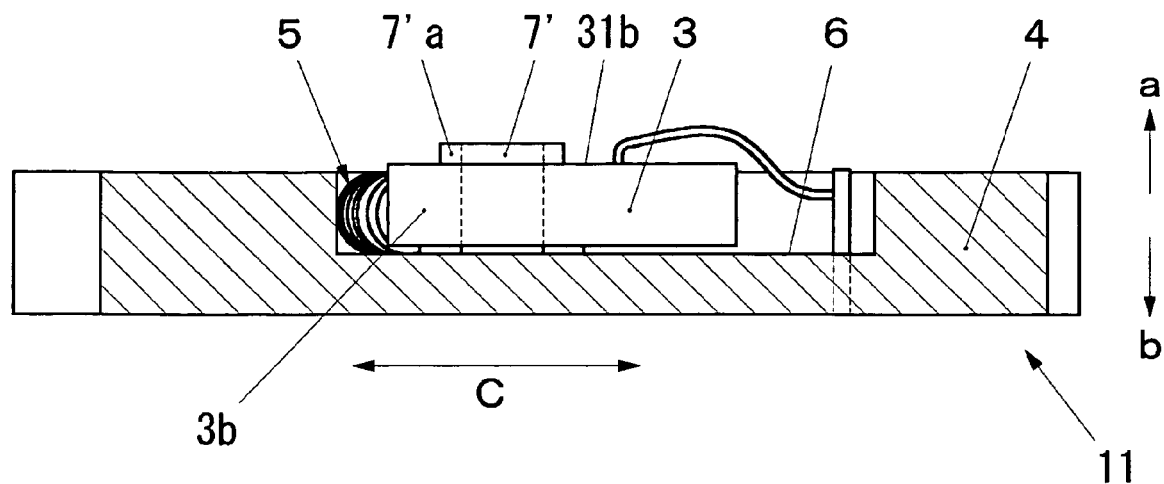
FIG. 20 is a schematic partial side sectional view of FIG. 19, taken along the dash-dotted line A—A.

Three representative embodiments of the present invention are described above, but the present invention is not limited to those three. It is possible, for example, to have the brush arm 3*a* and the brush base 3*b* of the first embodiment be separate pieces, as shown in FIG. 15, with only the brush arm 3*a* being made of carbon.

INDUSTRIAL APPLICABILITY

As stated above, the present invention uses the means of insert molding the support posts that support the brushes into the brush holder and the means of fixing the other end of each support post by spreading with the caulking iron, and so makes it possible to prevent reduction of fixing strength as an action of heat generated as the motor to which the brush device is fitted and fixed is driven. Accordingly, the fixing of both ends of the support posts can be kept firm even as the motor is driven over a long period, and stability of support of the brushes can be maintained. Therefore, the brushes are always in contact with the commutator, and so the reliability of electrical and mechanical contact between the brushes and commutator can be improved in motors driven for long periods.

Further, by using the caulking iron to fix the ends of the support posts as described above, it is possible to assure adequate fixing strength relative to the other ends, which are fixed by insert molding. Accordingly, it is possible to fix both ends firmly, and so it is possible to have firm support of the brushes. As a result, it is possible to keep the brushes and commutator always in contact, and so the reliability of electrical and mechanical contact between the brushes and commutator can be improved in motors driven for long periods.

Moreover, by having the cover plate to cover the windings of the springs, in brush devices that use coil springs, it is possible to control the pushing out of the springs that occurs when the brush holder is driven. Accordingly, it is possible to keep the contact faces of the brushes rubbing the commutator blades 2*a* with the desired impulse.

When the cover plate is used, there will be a step on the support post and the cover plate is received by that step and a part of the brush holder. This prevents the cover plate from applying excessive pressure to the brush during fixing with the caulking iron, and so the brush is able to rotate freely under the impulse of the spring.

The invention claimed is:

1. A brush device comprising a brush and a spring, the brush including a brush arm made of carbon, which is substantially arc shaped-and which has a contact face that conducts electricity when in contact with a commutator, and a brush base mounted so as to rotate around a support post, the brush being mounted in a brush holder so that rotation around the support post puts a contact face in contact with the commutator, the spring impeling the brush toward the conmmutator, wherein one end of the support post at a face side of the brush base is formed with a hollow cylinder and the other end is formed with a projection, the projection of the support post is fixed into the brush holder by insert molding, a guide is formed on a part of the brush base, a recess is formed in the brush holder within which one end of a winding of the coil spring is stopped by the brush base and the other end is stopped by the brush holder, the coil spring and brush are placed in substantially the same plane in such a manner that a longitudinal direction of the coil spring matches a direction of a surface of the brush holder and the winding of the coil spring follows the shape of at least one of the guide and the recess, and the one end of the support post is fixed to the surface of the brush base by spreading the hollow cylindrical end of the support post.

2. A brush device comprising a brush and a spring, the brush including a brush arm made of carbon, which is substantially arc shaped and which has a contact face that conducts electricity when in contact with a commutator, and a brush base mounted so as to rotate around a support post, the brush being mounted in a brush holder so that rotation around the support post puts a contact face in contact with the commutator, the spring impeling the brush toward the commutator, wherein one end of the support post is formed with a hollow cylinder and the other end is formed with a projection, the projection of the support post is fixed into the brush holder by insert molding, a recess is formed in the brush holder, the brush base made of a sheet material includes an insertion tube for insertion of the support post and a guide for accommodating the coil spring, which are integrated with the brush member as a single unit, the brush is accommodated within the recess of the brush holder by insertion of the support post into the insertion tube, one end of a winding of the coil spring is stopped by the brush base and the other end is stopped by the brush holder, the coil spring and brush are placed in substantially the same plane in such a manner that a longitudinal direction of the coil spring matches a direction of a surface of the brush holder and the winding of the coil shaped coil spring follows the shape of at least one of the guide and the recess, and the one end of the support post is fixed to one end of the insertion tube by spreading the hollow cylindrical end of the support post.

3. A brush device comprising a brush and a spring, the brush including a brush arm made of carbon, which is substantially arc shaped and which has a contact face that conducts electricity when in contact with a conmmutator, and a brush base mounted so as to rotate around a support post, the brush being mounted in a brush holder so that rotation around the support post puts a contact face in contact with the commutator, the spring impeling the brush toward the commutator, wherein one end of the support post is formed with a hollow cylinder and the other end is formed with a projection, the projection of the support post is fixed into the brush holder by insert molding, the spring is constituted so as to be a torsion coil spring, a recess is formed in the brush holder, the brush base is made of a sheet material and includes an insertion tube for insertion of the support post that is integrated with the brush member as a single unit, the brush is accommodated within the recess of the brush holder by insertion of the support post into the insertion tube, the torsion coil spring is fitted over an outer periphery of the insertion tube in such a manner that a longitudinal direction of the torsion coil spring is placed perpendicular to a direction of the face of the brush holder, an end of a spring wire that extends from one side of a winding of the torsion coil spring is stopped by the brush holder and another end of the spring wire that extends from the other side is stopped by the brush, and the one end of the support post is fixed to one end of the insertion tube by spreading the hollow cylindrical end of the support post.

4. A brush device comprising a brush and a spring, the brush including a brush arm made of carbon, which is substantially arc shaped and which has a contact face that conducts electricity when in contact with a commutator, and a brush base mounted so as to rotate around a support post, the brush being mounted in a brush holder so that rotation around the support post puts a contact face in contact with the commutator, the spring impeling the brush toward the commutator, wherein one end of the support post at a face side of the brush base is formed with a hollow cylinder and the other end is formed with a projection, the projection of the support post is fixed into the brush holder by insert molding, a guide is formed on a part of the brush base, a recess is formed in the brush holder within which one end of a winding of the coil spring is stopped by the brush base and the other end is stopped by the brush holder, the coil spring and brush are placed in substantially the same plane in such a manner that a longitudinal direction of the coil spring matches a direction of a surface of the brush holder and the winding of the coil spring follows the shape of at least one of the guide and the recess, a step is formed on the support post, there is provided a cover plate attached so as to cover the winding of the coil spring when viewed from a direction perpendicular to the face of the brush holder, which is received by the step of the support post and a portion of the brush holder, and the one end of the support post is fixed to the surface of the cover plate by spreading the hollow cylindrical end of the support post.

5. A brush device comprising a brush and a spring, the brush including a brush arm made of carbon, which is substantially arc shaped and which has a contact face that conducts electricity when in contact with a commutator, and a brush base mounted so as to rotate around a support post, the brush being mounted in a brush holder so that rotation around the support post puts a contact face in contact with the commutator, the spring impeling the brush toward the commutator, wherein one end of the support post is formed with a hollow cylinder and the other end is formed with a projection, the projection of the support post is fixed into the brush holder by insert molding, a recess is formed in the brush holder, the brush base made of a sheet material includes an insertion tube for insertion of the support post and a guide for accommodating the coil spring, which are integrated with the brush member as a single unit, the brush is accommodated within the recess of the brush holder by insertion of the support post into the insertion tube, one end of a winding, of the coil spring is stopped by the brush base and the other end is stopped by the brush holder, the coil spring and brush are placed in substantially the same plane in such a manner that a longitudinal direction of the coil spring matches a direction of a surface of the brush holder and the winding of the coil spring follows the shape of at least one of the guide and the recess, a step is formed on the support post, there is provided a cover plate attached so as to cover the winding of the coil spring when viewed from a direction perpendicular to the face of the brush holder, which is received by the step of the support post and a portion of the brush holder, and the one end of the support post is fixed to the surface of the cover plate by spreading the hollow cylindrical end of the support post.

6. A motor with a brush equipped with the brush device of any one of claims 1–3, 4 and 5.

* * * * *

UNITED STATES PATENT AND TRADEMARK OFFICE
CERTIFICATE OF CORRECTION

| | | |
|---|---|---|
| PATENT NO. | : 7,242,127 B2 | Page 1 of 1 |
| APPLICATION NO. | : 10/545966 | |
| DATED | : July 10, 2007 | |
| INVENTOR(S) | : Atsushi Okamoto | |

It is certified that error appears in the above-identified patent and that said Letters Patent is hereby corrected as shown below:

On The Cover Page:

Item (73) Assignee should read: NAMIKI SEIMITSU HOUSEKI KABUSHIKI KAISHA, Tokyo (JP)

Signed and Sealed this
Fourth Day of January, 2011

David J. Kappos
*Director of the United States Patent and Trademark Office*